July 5, 1966  C. L. ROPPEL  3,259,343
CONTROL APPARATUS FOR VERTICAL TAKE-OFF AIRCRAFT
Filed Sept. 23, 1964  2 Sheets-Sheet 1
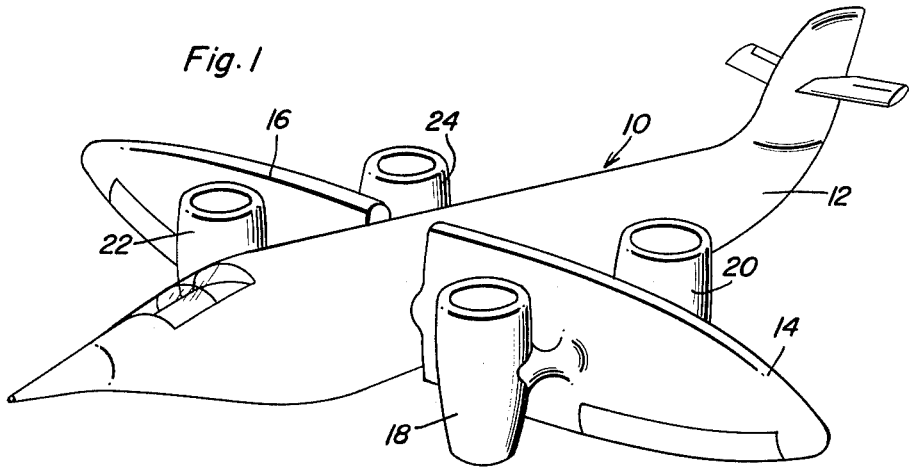
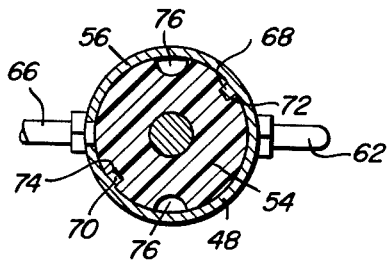
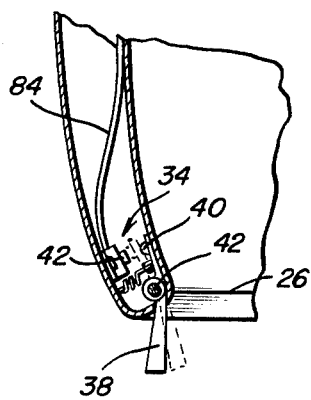
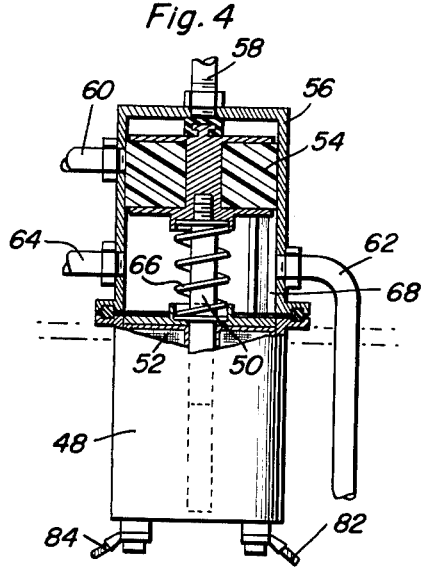
Clarence L. Roppel
INVENTOR.

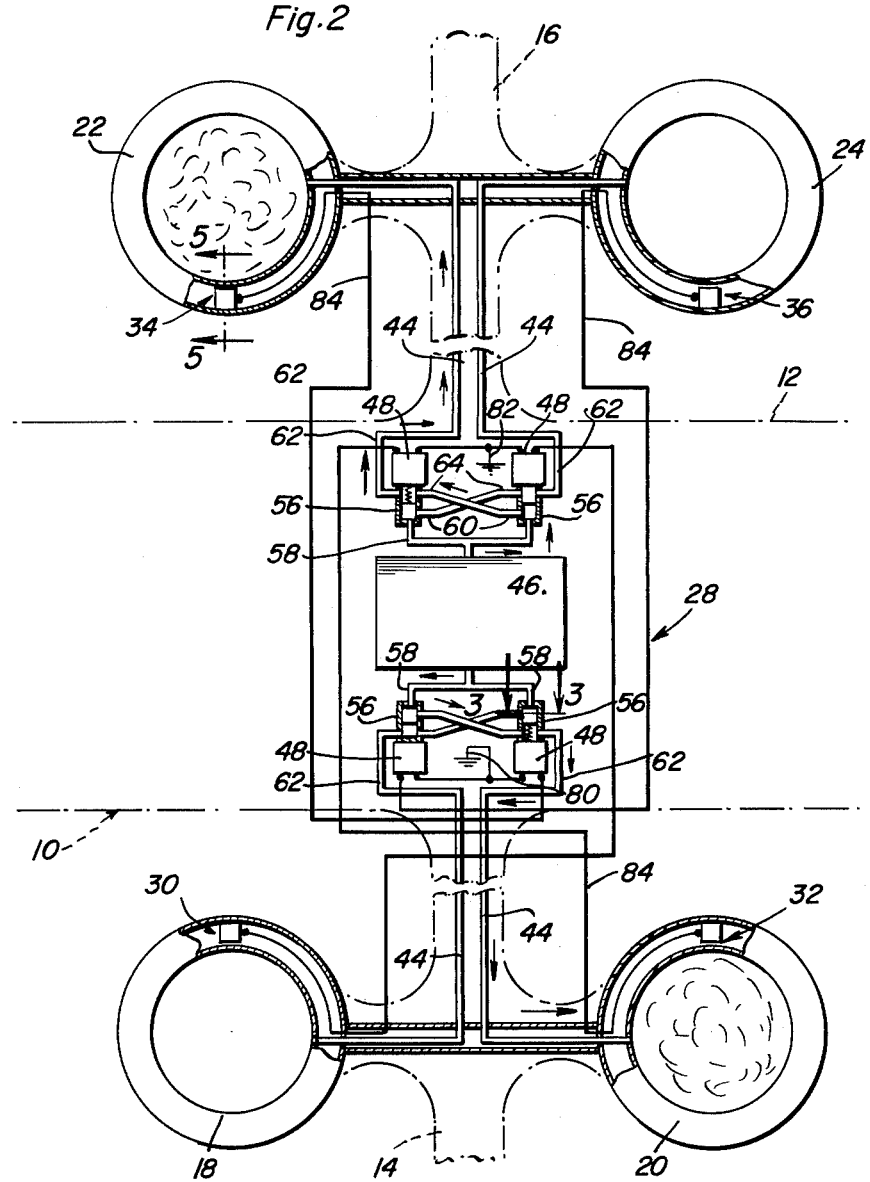

United States Patent Office 3,259,343
Patented July 5, 1966

3,259,343
CONTROL APPARATUS FOR VERTICAL
TAKE-OFF AIRCRAFT
Clarence L. Roppel, Fairdale, N. Dak.
Filed Sept. 23, 1964, Ser. No. 398,546
12 Claims. (Cl. 244—53)

This invention relates to a novel and useful thrust motor control means designated primarily for use in controlling the operation of thrust producing motor means utilized on vertical take-off aircraft.

Vertical take-off aircraft of various types are often provided with motor means disposed on opposite sides of the longitudinal centerline of the aircraft and operative to effect a vertical thrust whereby the aircraft may take off substantially vertically. When vertical take-off aircraft are provided with thrust developing motors on opposite sides of the longitudinal centerline of the aircraft, as a precautionary measure it may be considered beneficial to provide at least two vertical thrust motors on each side of the longitudinal centerline of the aircraft in order that failure of one thrust motor on one side of the longitudinal centerline may be offset by purposeful termination of one of the thrust motors on the other side of the longitudinal centerline of the aircraft thereby maintaining proper balance of the aircraft and greatly reducing the possibility of the failure of one thrust motor causing the aircraft to roll violently about its longitudinal axis.

The control apparatus of the instant invention is specifically designed for use on the aforementioned type of multi-engine vertical take-off aircraft and is operative to automatically sense termination of proper operation of either of the vertical thrust motors of the vertical take-off aircraft and to almost immediately effect termination of one of the vertical thrust motors on the other side of the longitudinal axis of the aircraft remote from the malfunctioning vertical thrust motor.

In addition to including at least one pair of vertical thrust motors on opposite sides of the longitudinal centerline of a vertical take-off aircraft, it may be further thought to be advisable to space the vertical thrust motors on each side of the longitudinal centerline of the vertical take-off aircraft longitudinally of the vertical take-off aircraft. In this manner, if the center of gravity of the aircraft is located closely adjacent the intersection of longitudinal and transverse planes passing and equally spaced between the transversely and longitudinally spaced vertical thrust motors of the aircraft, the center of vertical thrust developed by the vertical thrust motors will substantially coincide with the center of gravity of the aircraft and accordingly proper positioning of the vertical thrust motors in a horizontal plane spaced above the center of gravity of the aircraft will greatly assist in stabilizing the aircraft during vertical take-offs.

The control apparatus of the instant invention not only includes means for terminating operation of one vertical thrust motor on one side of the longitudinal centerline of the aircraft in response to malfunction of one of the other vertical thrust motors disposed on the other side of the longitudinal centerline of the aircraft, but also includes means by which the vertical thrust motor whose operation is terminated by the control means is that vertical thrust motor disposed on the side of the aforementioned transverse plane remote from the malfunctioning vertical take-off motor. Accordingly, even though the control apparatus of the instant invention may operate to terminate operation of one vertical thrust motor in response to malfunctioning of another vertical thrust motor, the center of thrust affected by the remaining vertical thrust motors in operation will still remain substantially centered over the center of gravity of the vertical take-off aircraft.

Still further, the control apparatus of the instant invention is designed specifically to terminate operation of a first vertical thrust motor burning liquid fuel in response to malfunctioning of a second and controlling vertical thrust motor by terminating the flow of fuel to the first thrust motor. The control apparatus further includes means operative, in response to termination of operation of the first motor, to terminate operation of the second motor. Still further, the control means additionally includes means whereby any motors remaining in operation will be supplied with an additional supply of fuel so as to increase the power developed thereby.

The main object of this invention is to provide a control apparatus for vertical take-off aircraft which will be capable of operating to maintain a lateral balance from vertical thrust should one vertical thrust motor of a vertical take-off aircraft of the type hereinbefore set forth malfunction to the extent of realizing a substantial reduction in vertical thrust developed thereby.

Another object of this invention, in accordance with the immediately preceding object, is to provide a control apparatus including means by which the normal flow of liquid fuel to the engine whose operation has been terminated by the control apparatus will be bypassed to the adjacent vertical thrust motor disposed on the same side of the longitudinal axis of the vertical aircraft.

Yet another object of this invention, in accordance with the preceding objects, is to provide a control apparatus responsive to a reduction in vertical thrust developed by one vertical thrust motor to terminate the flow of liquid fuel to a second vertical thrust motor disposed on the opposite side of the longitudinal centerline of the aircraft and to in turn, in response to termination of operation of the second vertical thrust motor, terminate the flow of fuel to the first malfunctioning vertical thrust motor which initially caused termination of operation of the second vertical thrust motor.

Yet another object of this invention is to provide a control apparatus in accordance with the preceding objects whose operation will be almost instantaneous in order that proper lateral thrust balance of the vertical take-off aircraft may be quickly restored immediately upon malfunctioning of one vertical thrust motor of the aircraft to the point where an appreciable loss of vertical thrust is realized by the malfunctioning of the vertical thrust motor.

A final object of this invention to be specifically enumerated herein is to provide a control apparatus for vertical take-off aircraft which will conform to conventional forms of manufacture, be of simple construction and automatic in operation so as to provide a device that will be economically feasible, long lasting and fully automatic in operation and therefore not required to be under the constant control of the pilot of the associated vertical take-off aircraft.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of a vertical take-off aircraft constructed in accordance with the present invention;

FIGURE 2 is a fragmentary top plan view of the center portion of the vertical aircraft illustrated in FIGURE 1 with portions thereof being broken away and shown in phantom lines and in horizontal section and the control apparatus of the instant invention diagrammatically illustrated and operatively connected to the four vertical thrust motors of the vertical take-off aircraft;

FIGURE 3 is an enlarged fragmentary longitudinal vertical sectional view taken substantially upon the plane indicated by section line 3—3 of FIGURE 2;

FIGURE 4 is an enlarged top plan view of one of the solenoid controlled dual valves of the control apparatus of the instant invention with parts thereof being broken away and shown in horizontal section; and FIGURE 5 is an enlarged fragmentary transverse vertical sectional view taken substantially upon the plane indicated by the section line 5—5 of FIGURE 2.

Referring now more specifically to the drawings, the numeral 10 generally designates a vertical take-off aircraft including a longitudinally extending fuselage 12 and a pair of laterally projecting wing sections 14 and 16. The wing sections 14 and 16 are rotatably supported from the fuselage 12 in any convenient manner (not shown) for oscillation about axes extending transversely of the fuselage 12 and the wing section 14 includes a depending lower thrust motor 18 and an upper thrust motor 20 while the wing section 16 includes a depending lower thrust motor 22 and an upper thrust motor 24.

The thrust motors 18, 20, 22 and 24, when the wing sections 14 and 16 are horizontally disposed, are operative to effect a rearward thrust and to thereby propel the fuselage 12 in a forward direction or to the left as viewed in FIGURE 1 of the drawings. However, when the wing sections 14 and 16 are oscillated to the upstanding positions illustrated in FIGURE 1 of the drawings, the thrust motors 18, 20, 22 and 24 are operative to effect a downward thrust and thereby an upward thrust on the fuselage 12 by way of reaction.

The center of gravity of the aircraft 10 is located approximately at the intersection of a vertical plane passing along the longitudinal centerline of the fuselage 12 and a vertical plane in which the upstanding wing sections 14 and 16 are disposed as viewed in FIGURE 1 of the drawings. Accordingly, it may be seen that the thrust motors 18 and 22 are disposed forward of the center of gravity of the fuselage 12 and that the thrust motors 20 and 24 are disposed rearwardly of the center of gravity. It will also of course be obvious that the thrust motors 18 and 20 are disposed on one side of the center of gravity of the fuselage 12 and that the thrust motors 22 and 24 are disposed on the other side of the center of gravity of the fuselage 12. Accordingly, operation of all of the thrust motors 18, 20, 22 and 24, as viewed in FIGURE 1, will center the upward thrust applied to the fuselage 12 in substantial vertical alignment with the center of gravity of the fuselage 12 and inasmuch as the horizontal plane in which the centers of thrust effected by the thrust motors 18, 20, 22 and 24 are disposed above the center of gravity of the fuselage 12 when the wing sections 14 and 16 are positioned as shown in FIGURE 1 of the drawings, the center of upward thrust applied to the fuselage 12 by the thrust motors 18, 20, 22 and 24 is vertically spaced above the center of gravity of the fuselage 12. In this manner stability of the aircraft 10 during the vertical take-off is greatly increased.

The vertical thrust motors 18, 20, 22 and 24 are of the jet motor type and include jet outlet openings 26 at their lower ends when the wing sections 14 and 16 are positioned as shown in FIGURE 1 of the drawings. The control apparatus of the instant invention is generally referred to by the reference numeral 28 and includes four thrust motor operating sensing components generally referred to by the reference numerals 30, 32, 34 and 36. As can best be seen from FIGURE 5 of the drawings each of the components 30, 32, 34 and 36 includes a pivoted spring-urged exhaust flow flap 38 including an electrical contact 40 and pivotally supported by means of a pivot pin 42. Operation of each of the thrust motors 18, 20, 22 and 24 to effect a minimum amount of thrust will cause the corresponding flap 38 to be pivoted from the phantom line position illustrated in FIGURE 5 of the drawings to the solid line position. In this solid line position the electrical contact 40 is moved out of contact with a second electrical contact 42. Each of the jet thrust motors 18, 20, 22 and 24 includes a fluid fuel delivery line 44 which is communicated with a fuel supply 46 which is under pressure. Each of the fluid fuel delivery lines 44 is communicated with the fluid fuel supply 46 by means of a solenoid actuated fuel control valve 48. Each solenoid actuated fluid control valve 48 includes an armature 50 which is slidable in an electromagnetic coil 52 and which supports a valve head 54. Each of the valve heads 54 is generally cylindrical in transverse section and is reciprocal in a cylindrical housing 56 including a pair of fuel inlets 58 and 64 and a pair of fuel outlets 62 and 60. The fuel outlets 62 are connected directly to the corresponding fluid fuel delivery lines 44 and each of the fuel outlets 60 is communicated with the fuel inlet 64 of the adjacent fuel control valve 48.

Each armature 50 has a coil spring 66 disposed thereabout which normally urges the corresponding valve head 54 to the extended position illustrated in FIGURE 4 of the drawings and it may be seen from a comparison of FIGURES 3 and 4 of the drawings that each of the cylindrical housings 56 includes a pair of diametrically opposite keys 68 and 70 which are slidably received in diametrically opposite longitudinally extending and radially outwardly opening slots or grooves 72 and 74 formed in the corresponding valve head 54. In addition, each of the valve heads 54 may be seen to include a pair of diametrically opposite and radially outwardly opening fuel passage grooves 76 which extend throughout the length of each valve head 54.

Each of the electrical contacts 40 may be electrically connected to a suitable source of electrical potential and contact engagement of corresponding contacts 40 and 42 will in turn communicate the electromagnetic coil 52 of the associated control valve 48 with the source of electrical potential (not shown). It will be noted that each of the electromagnetic coils 52 is suitably grounded either at 80 or 82 and that each of the electrical contacts 42 is electrically communicated with the associated electromagnetic coil 52 by means of a conductor 84. However, it may be seen that the electrical contacts 42 of the thrust motor operating sensing components 30, 32, 34 and 36 are operatively connected, by means of conductors 84, to the solenoid actuated fuel control valves 48 which directly control the flow of liquid fuel to the thrust motors 24, 22, 20 and 18. In this manner, a reduction of the thrust of any thrust motor will cause the solenoid actuated fuel control valve 48 controlling the diagonally opposite thrust motor to shut off the supply of liquid fuel to that diagonally opposite thrust motor and thereby terminate its operation, which termination of operation will then cause the solenoid actuated fuel control valve 48 controlling the fluid motor having the initial malfunction to terminate the flow of fluid fuel to that malfunctioning thrust motor.

In addition, contact of either pair of contacts 40 and 42 with each other will cause the valve head 54 of the associated solenoid actuated fuel control valve 48 to be pulled toward the corresponding electromagnetic coil 52 by means of actuation of the latter. This movement of the valve head 54 will of course effect the termination of fluid fuel flow to the diagonally opposite thrust motor and at the same time, by means of the fluid passage grooves 76 in the actuated valve head 54, enable the supply of fluid fuel normally delivered to the thrust motor whose operation has been terminated to be directed to the thrust motor adjacent the malfunctioning thrust motor. Of course, as hereinbefore set forth, the termination of the flow of fluid fuel to the thrust motor diagonally opposite the malfunctioning thrust motor will effect termination of operation of that diagonally opposite thrust motor and in turn effect the termination of fluid fuel to the malfunctioning thrust motor. The termination of flow of fluid fuel to the malfunctioning thrust motor will in turn also cause the fluid fuel normally supplied thereto to be supplied to the thrust motor adjacent the malfunctioning thrust motor.

The keys 68 and the grooves 72 prevent the valve heads 54 from rotating relative to the cylindrical housings 56 to a position wherein the fuel passage grooves 76 would be registered with the fuel inlet 64 and the fuel outlets 62 and 60 of the corresponding cylindrical housing 56.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination, an aircraft frame including a center of gravity and first and second pairs of thrust developing means disposed on opposite sides of said center of gravity, each thrust developing means of each pair thereof corresponding to a thrust developing means of the other pair thereof, and a plurality of automatic thrust equalizing control means equal in number to said thrust developing means and each operatively connected to a thrust developing means for actuation thereby and to its corresponding thrust developing means of the other pair of thrust developing means for control thereof, each of said control means including means operative, responsive to a reduction of power developed by its actuating thrust developing means below a predetermined minimum, to terminate operation of the thrust developing means controlled thereby.

2. In combination, an aircraft frame including a center of gravity, a pair of thrust developing means supported on said frame on opposite sides of said center of gravity, a pair of automatic thrust equalizing control means for said thrust developing means each operatively connected to its corresponding thrust developing means for actuation thereby and to the other thrust developing means for control thereof, each of said control means including means, responsive to a reduction of thrust developed by its actuating thrust developing means below a predetermined minimum, to terminate operation of the thrust developing means controlled thereby.

3. The combination of claim 1 wherein said air frame defines a longitudinal axis extending longitudinally thereof and a lateral axis disposed normal to said longitudinal axis, each of said axes passing through said center of gravity, said first and second pairs of thrust developing means being disposed on opposite sides of said longitudinal axis and the thrust developing means of each pair of thrust developing means being disposed on opposite sides of said lateral axis.

4. The combination of claim 3 wherein said axes are generally horizontal and said thrust developing means each develop a generally vertical thrust.

5. The combination of claim 4 wherein each control means controls the thrust developing means of the other pair of thrust means disposed on the other side of the transverse axis.

6. The combination of claim 1 wherein said thrust developing means each comprise a reaction motor.

7. The combination of claim 6 wherein said air frame defines a longitudinal axis extending longitudinally thereof and a lateral axis disposed normal to said longitudinal axis, each of said axes passing through said center of gravity, said first and second pairs of thrust developing means being disposed on opposite sides of said longitudinal axis and the thrust developing means of each pair of thrust developing means being disposed on opposite sides of said lateral axis.

8. The combination of claim 7 wherein said axes are generally horizontal and said thrust developing means each develop a generally vertical thrust.

9. The combination of claim 8 wherein each control means controls the thrust developing means of the other pair of thrust means disposed on the other side of the transverse axis.

10. The combination of claim 1 wherein each of said thrust developing means comprises a fluid fuel burning motor, said control means including means operative, when actuated, to terminate the flow of liquid fuel to the thrust developing means controlled thereby.

11. The combination of claim 10 wherein each of said means operative to terminate the flow of liquid fuel to the thrust developing means controlled thereby also includes means, when the last-mentioned fuel flow terminating means is actuated, operative to communicate the terminated fuel flow with the other thrust developing means of the corresponding pair of thrust developing means.

12. In combination with a pair of fluid fuel burning motors including fuel inlets, an automatic control assembly operatively connected to each of said motors including means responsive to a reduction of power developed by the motor to which it is connected below a predetermined minimum and operatively connected to the fluid fuel inlet for the other motor for automatically terminating the flow of fluid fuel to the other of said motors.

References Cited by the Examiner

UNITED STATES PATENTS

| | | | |
|---|---|---|---|
| 2,737,015 | 3/1956 | Wright | 60—35.6 |
| 2,886,011 | 5/1959 | Radford | 60—97 |
| 3,107,881 | 10/1963 | Stuart | 244—7 |
| 3,136,499 | 6/1964 | Kessler | 244—7 |
| 3,173,628 | 3/1965 | Marchant et al. | 244—12 |

MILTON BUCHLER, *Primary Examiner.*

L. C. HALL, *Assistant Examiner.*